Dec. 29, 1925.
R. E. ROHNE
1,567,388
EXPANSIBLE AUTO TRUNK
Filed June 4, 1923
2 Sheets-Sheet 1
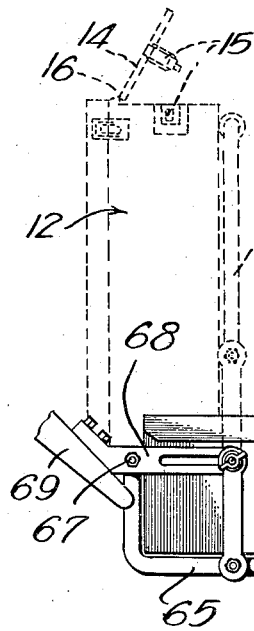
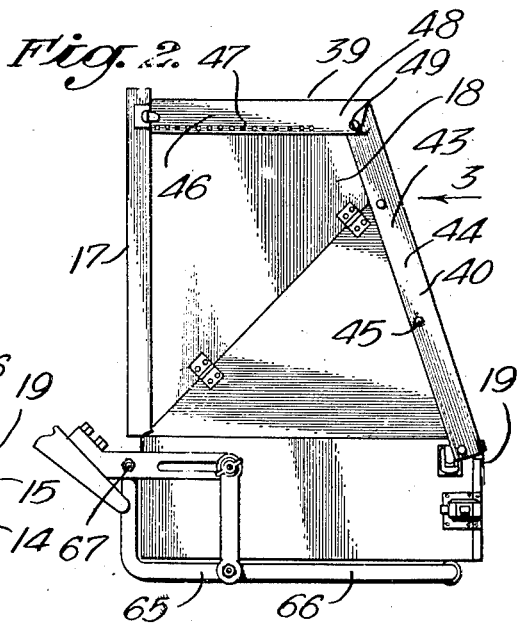
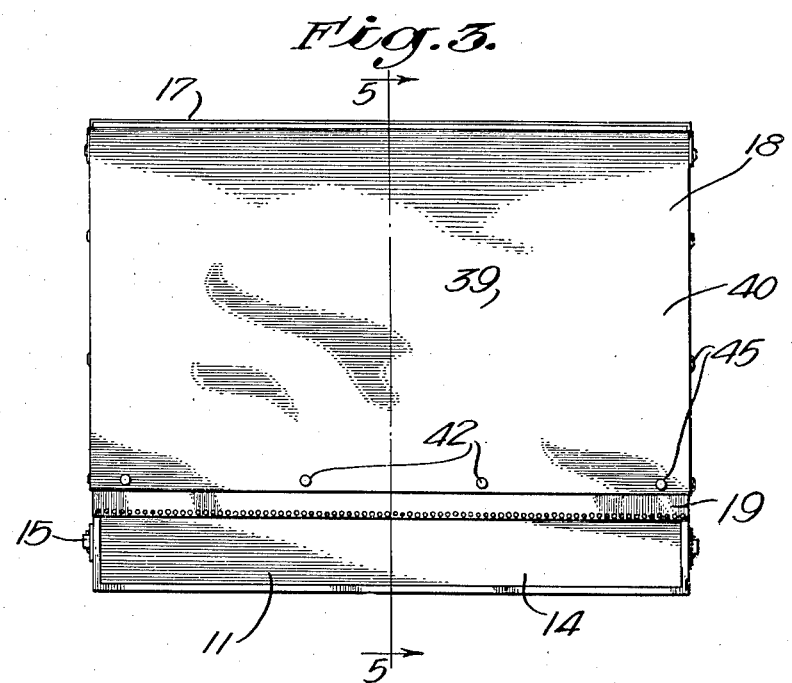
INVENTOR:
Robert E. Rohne,
BY
Graham + Davis
ATTORNEYS.

Dec. 29, 1925.  
R. E. ROHNE  
EXPANSIBLE AUTO TRUNK  
Filed June 4, 1923  
1,567,388  
2 Sheets-Sheet 2
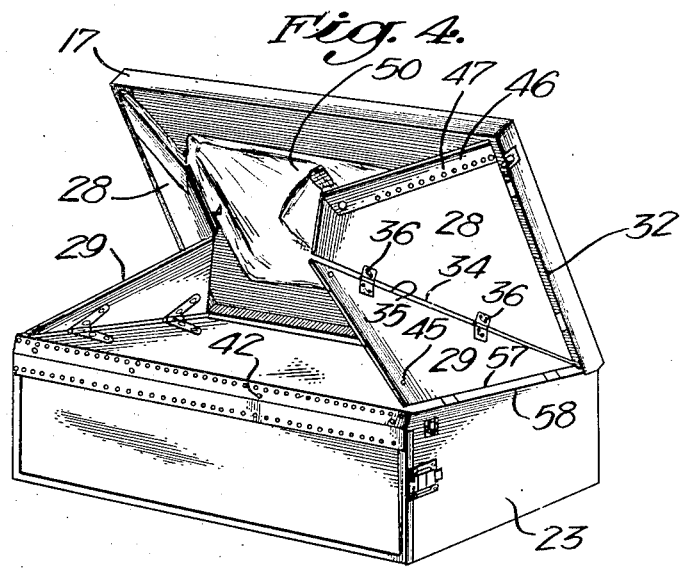
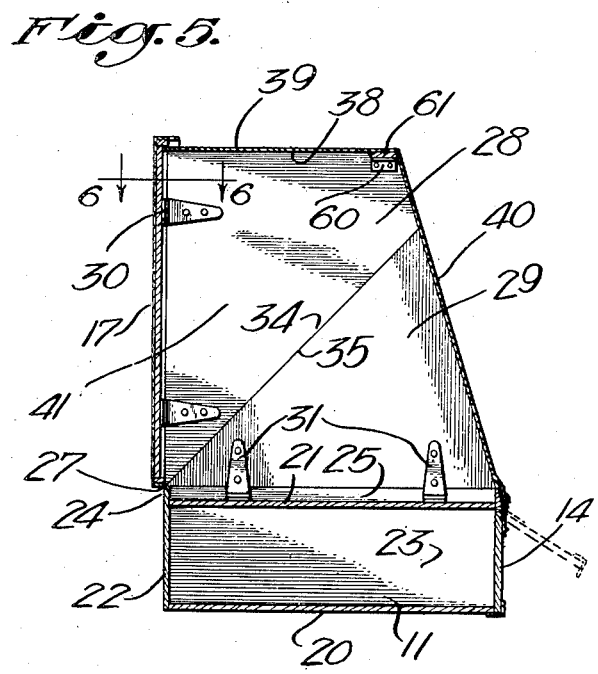
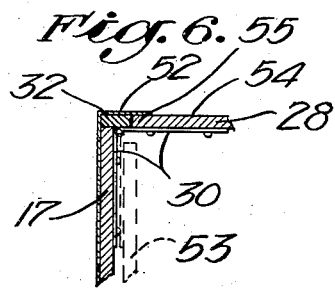
INVENTOR:  
Robert E. Rohne,  
By  
ATTORNEYS Patented Dec. 29, 1925.

1,567,388

UNITED STATES PATENT OFFICE.

ROBERT E. ROHNE, OF LOS ANGELES, CALIFORNIA.

EXPANSIBLE AUTO TRUNK.

Application filed June 4, 1923. Serial No. 643,261.

*To all whom it may concern:*

Be it known that I, ROBERT E. ROHNE, a citizen of the United States, residing at Los Angeles, in the county of Los Angeles and State of California, have invented a new and useful Expansible Auto Trunk, of which the following is a specification.

This invention relates to luggage carrying devices suitable for use on vehicles such as automobiles for the purpose of carrying various amounts of luggage.

It is an object of the invention to provide an auto trunk adapted to be secured upon the back of an automobile and arranged for employment in upright and lowered position.

A feature of the invention is that when it is disposed in upright position but small space is consumed thereby, and the appearance of the automobile in general is contributed to. The trunk upon being lowered into horizontal or lowered position is provided with foldable members which may be quickly arranged to form a rigid housing of comparatively large size in which articles such as suit cases or a small trunk and miscellaneous small articles may be placed and be entirely enclosed by the housing so as to be inconspicuous. The form of the device when in expanded position is agreeable in design.

It is a further object of the invention to provide an expansible trunk which may be quickly placed in expanded arrangement and is very rigid in structure.

The especial advantages of the invention and further objects thereof will be made evident hereinafter.

Referring to the drawings which are for illustrative purposes only,

Fig. 1 is a view showing a trunk embodying the features of my invention mounted upon the improved rack, for which I am separately making application for United States Letters Patent.

Fig. 2 is a view similar to Fig. 1 showing the trunk in expanded arrangement.

Fig. 3 is an elevation taken as indicated by the arrow 3 in Fig. 2.

Fig. 4 is a perspective view showing the trunk in partly collapsed position.

Fig. 5 is a section taken on a plane represented by the line 5—5 of Fig. 3.

Fig. 6 is a fragmentary section taken on a plane represented by the line 6—6 of Fig. 5.

In the form of my invention shown in the drawings, a trunk or container 11 of flat rectangular prism form is employed. This trunk 11 is adapted for use upon the rear of an automobile in raised position as indicated by the dotted lines 12 in Fig. 1 and in lowered or horizontal position as indicated at 13 in this figure. A top cover member 14 is provided at what constitutes the top of the container when it is in the upright position 12, this cover being securable by a fastening 15 and providing access to the interior of the trunk 11 which is of such size that a large suit case may be placed therein.

A side cover member 17 is provided on the trunk 11. The member 14 is hinged at 16 and is provided with a weatherproofing strip 19 which is tacked over the line of hinging to make the interior of the trunk dust and waterproof. When in closed position, the side cover member 17 conceals foldable members which may be unfolded when the cover 17 is raised as indicated in Fig. 2, to form a housing 18 as indicated in Figs. 2 and 3, in which housing a number of suit cases or a small trunk may be enclosed and carried. As best shown in Fig. 5, the trunk 11 is constructed of side walls 20 and 21, bottom and edge walls 22 and 23 respectively, which edge walls extend beyond the side wall 21, as indicated at 24 in Fig. 5, thus providing a shallow recess 25 in one side of the trunk.

The side cover 17 is hinged to the trunk 11 at 27 and foldable side wall members 28 and 29 are hinged respectively at 30 and 31 to the cover 17 and the container 11, the wall member 28 being hinged to the edge-strip 32 of the side cover 17 and the wall 29 being hinged to the extended portions of the walls 23 of the container. The hinges indicated at 30 and 31 are arranged inside the cover and the recess 25 so that they may swing inwardly. The edges 34 and 35 of the members 28 and 29 are cut on an angle of 45 degrees respective to the right angle defined by the axes of the hinges indicated at 30 and 31. Hinges 36 are employed for attaching the abutting edges 34 and 35, and permit the side wall formed from the cooperating members 28 and 29 to break and fold inwardly on the diagonal line, so that when the cover member 17 is lowered from the raised position indicated in Figs. 2 and 5 the side wall members 28 and 29 will fold inwardly, and will rest within the recess 25 when the cover member 17 is in closed position as indicated in Fig. 1.

Secured to the upper edges 38 of the wall members 28 is a flexible cover member 39 having a flap 40 which may be secured over the front of the chamber 41 formed between the members 17, 21, 28, 29 and 39, edge strips 43 being provided on the flap 40 which extend over the side wall members 28 and 29 as indicated at 44 in Fig. 2 and may be secured thereto by snap fasteners 45. Snap fasteners 45 are also provided on the front side of the container 11 as indicated at 42, to which the loose end of the cover 39 may be fastened. The cover member 39 is also provided with upper edge strips 46 which extend downward over the edges 38 of the side wall members 28 and are secured thereto in a suitable manner such as by tacks 47, the outer ends 48, Fig. 2, of the strips 46 being left loose and arranged to fit over the upper ends 49 of the side strips 43.

When it is desired to collapse the housing 18, Fig. 2, the flap 40 is first unfastened and folded back within the side wall members 28 in a position adjacent to the inside of the side cover member 17 as indicated at 50 in Fig. 4. The side wall members 28 and 29 may then be folded inwardly during the lowering of the cover 17 in the manner previously described.

The foldable members arranged upon the side of the trunk 11 form a substantially waterproof housing when expanded, this condition being accomplished by the structural arrangement employed. As shown in Fig. 6 of the drawing, the side cover member 17 is provided with a metal flange 52 which extends beyond the edge strips 32 thereof. The hinges 30 are secured to the side cover member 17 and the side wall member 28 as shown in Fig. 6, so that when the member 28 is opened from the closed position indicated by the dotted lines 53 to the open position indicated at 54, the edge 55 of each side wall member 28 will be overlapped by a metal flange 52. The side wall members 29 are so situated upon the hinges 31 that the lower edges 57 thereof, Fig. 4, swing into positions of abutment with the edges 58 of the walls 23 when the foldable members are placed in expanded arrangement.

As shown in Fig. 5, a metal clip 60 is placed in the corner of each side wall member 28, these clips being arranged to support a cross bar 61 which is placed thereacross for the purpose of holding the side wall members 28 and 29 in open position. This bar 61 is all that is needed to lock the side cover 17 and the side wall members 28 and 29 in rigid open position, owing to the fact that the side wall members when opened into positions of alignment constitute rigid webs extending between the trunk 11 and the cover 17.

The rack 65 shown in Figs. 1 and 2 provides a frame portion 66 upon which the trunk 11 is secured. This frame is pivoted at 67 to brackets 68 mounted on the automobile chassis 69. The upright and lowered positions of the trunk are attained by swinging the rack 65 between the lowered position indicated in full lines in Figs. 1 and 2 and the raised position indicated by the dotted lines 70 in Fig. 1.

I claim as my invention:

1. In an auto trunk of the class described, the combination of: a container adapted for use in upright and horizontal positions; a cover at the top of said container when said container is in upright position, for providing access to the interior of said container; and foldable members on the side of said container arranged to be expanded to form a housing in which articles may be carried, one of said foldable members being utilized as a cover for concealing other of said foldable members when said members are disposed in collapsed position.

2. In an auto trunk of the class described, the combination of: a container adapted for use in upright and horizontal positions; a cover at the top of said container when said container is in upright position, for providing access to the interior of said container; and foldable members on one side of said container arranged to be expanded to form a housing when said container is disposed in horizontal position, one of said foldable members being utilized as a cover for concealing other of said foldable members when said members are disposed in collapsed position.

3. In an auto trunk of the class described, the combination of: a container adapted for use in upright and horizontal positions; a cover at the top of said container when said container is in upright position, for providing access to the interior of said container; and foldable members on the side of said container arranged to be expanded to form a housing in which articles may be carried, one of said foldable members being hinged to said container and utilized as a cover for concealing other of said foldable members when said members are disposed in collapsed position.

4. In an auto trunk of the class described, the combination of: a container adapted for use in upright and horizontal positions; a cover for providing access to the interior of said container; and foldable members on one side of said container arranged to be expanded to form a housing when said container is disposed in horizontal position, one of said foldable members being hinged to said container and utilized as a cover for concealing other of said foldable members when said members are disposed in collapsed position.

5. In an auto trunk of the class described, the combination of: a container adapted for use in upright and horizontal positions; a cover for providing access to the interior of said container; a side cover member hinged to said container and arranged to substantially cover one side of said container; and foldable wall members hingedly attached to edges of said side cover members adjacent to the hinged edge of said side cover member, and hingedly attached to the edges of said container opposite to said edges of said side cover member to which said wall members are attached.

6. In an auto trunk of the class described, the combination of: a container adapted for use in upright and horizontal positions, a cover for providing access to the interior of said container; a side cover member hinged to said container and arranged to substantially cover one side of said container; and foldable wall members hingedly attached to edges of said side cover members adjacent to the hinged edge of said side cover member, and hingedly attached to the edges of said container opposite to said edges of said side cover member to which said wall members are attached; and a flexible member arranged to extend over the open recess formed between said container, said side cover member, and said wall members, in a manner to convert said recess into an enclosure in which articles may be carried.

7. In an auto trunk of the class described, the combination of: a container adapted for use in upright and horizontal positions; a cover for providing access to the interior of said container; a side cover member hinged to said container and arranged to substantially cover one side of said container; and foldable wall members hingedly attached to edges of said side cover members adjacent to the hinged edge of said side cover member, and hingedly attached to the edges of said container opposite to said edges of said side cover member to which said wall members are attached, each of said wall members consisting of a pair of co-operating members hinged together along a diagonal line; and a flexible member arranged to extend over the open recess formed between said container, said side cover member, and said wall members, in a manner to convert said recess into an enclosure in which articles may be carried.

In testimony whereof, I have hereunto set my hand at Los Angeles, California, this 29th day of May, 1923.

ROBERT E. ROHNE.